(12) United States Patent
Holmi et al.

(10) Patent No.: US 7,561,706 B2
(45) Date of Patent: Jul. 14, 2009

(54) REPRODUCING CENTER CHANNEL INFORMATION IN A VEHICLE MULTICHANNEL AUDIO SYSTEM

(75) Inventors: Douglas J. Holmi, Marlborough, MA (US); Hal P. Greenberger, Milford, MA (US); Lee A. Prager, Berlin, MA (US); Guy A. Torio, Ashland, MA (US)

(73) Assignee: Bose Corporation, Framingham, MA (US)

( * ) Notice: Subject to any disclaimer, the term of this patent is extended or adjusted under 35 U.S.C. 154(b) by 1047 days.

(21) Appl. No.: 10/838,759

(22) Filed: May 4, 2004

(65) Prior Publication Data

US 2005/0249356 A1 Nov. 10, 2005

(51) Int. Cl.
*H04R 5/02* (2006.01)

(52) U.S. Cl. ............... 381/306; 381/27; 381/302; 381/86; 725/75; 348/837

(58) Field of Classification Search ............ 381/86, 381/27, 302, 306, 310, 307, 1, 17; 725/75; 348/837, 840, 115, 118
See application file for complete search history.

(56) References Cited

U.S. PATENT DOCUMENTS

| | | | |
|---|---|---|---|
| 4,569,074 A | 2/1986 | Polk | |
| 4,866,776 A * | 9/1989 | Kasai et al. | 381/302 |
| 5,210,802 A | 5/1993 | Aylward | |
| 5,228,085 A | 7/1993 | Aylward | |
| 5,333,200 A | 7/1994 | Cooper et al. | |
| 5,754,664 A * | 5/1998 | Clark et al. | 381/86 |
| 5,764,777 A | 6/1998 | Goldfarb et al. | |
| 5,822,023 A | 10/1998 | Suman et al. | |
| 5,870,484 A | 2/1999 | Greenberger | |
| 6,304,173 B2 | 10/2001 | Pala et al. | |
| 6,522,368 B1 | 2/2003 | Tuccinardi et al. | |
| 6,853,732 B2 * | 2/2005 | Scofield | 381/27 |
| 6,871,356 B2 * | 3/2005 | Chang | 725/75 |
| 6,937,737 B2 * | 8/2005 | Polk, Jr. | 381/300 |
| 7,092,531 B2 * | 8/2006 | Enya et al. | 381/86 |
| 2002/0071574 A1 | 6/2002 | Aylward et al. | |
| 2003/0002693 A1 | 1/2003 | Aylward et al. | |
| 2003/0219137 A1 * | 11/2003 | Fincham | 381/302 |
| 2004/0237111 A1 | 11/2004 | Iraclianos et al. | |

FOREIGN PATENT DOCUMENTS

| | | |
|---|---|---|
| DE | 19938171 | 3/2001 |
| EP | 1 052 877 | 11/2000 |
| EP | 1 263 263 | 12/2002 |
| EP | 1 370 115 A | 12/2003 |

(Continued)

OTHER PUBLICATIONS

Chuck Tannert, Moving Pictures, Car Stereo Review, p. 27, Jan. 1999.

(Continued)

*Primary Examiner*—Vivian Chin
*Assistant Examiner*—Jason R Kurr
(74) *Attorney, Agent, or Firm*—Bose Corporation

(57) ABSTRACT

A vehicle sound system is constructed and arranged to establish a sound image at a desired location spaced from the sound source.

26 Claims, 10 Drawing Sheets

FOREIGN PATENT DOCUMENTS

| | | |
|---|---|---|
| EP | 1 389 892 | 2/2004 |
| JP | 2001/026244 | 5/2001 |
| JP | 2001/270391 | 10/2001 |
| JP | 2002/315099 | 2/2003 |
| WO | WO 99/48327 | 9/1999 |
| WO | WO 01/15489 A2 | 3/2001 |
| WO | WO 03/001885 A | 1/2003 |
| WO | WO 03/001885 A2 | 1/2003 |
| WO | WO 2005/004537 | 1/2005 |

OTHER PUBLICATIONS

Jeff Perlah, Car Toys, TMI Travel Theater Entertainment System, p. 17, Feb./Mar. 2001..
Olds Silhouette Van, Bose Vehicle shown to GM, Rochester Hills, MI, May 5, 1999. (Fig. 1).
Cadillac Imaj, Bose Vehicle, Detroit Auto Show, Cobo Center, Detroit, MI, Jan. 15, 2000. (Fig. 4).
GMT 600 Concept Car, Bose Vehicle, Texas Fairgrounds Car Show, Dallas, TX Sep. 2000. (Fig. 5).
Escalade Limo Concept Car Surround Speaker Layout, Las Vegas Convention Center, Las Vegas, NV, Nov. 4, 2003. (Figs. 2 and 3).
TV for your car, Car and Audio Electronics, Dec. 1999, p. 25.
Michael Waddell, Wonderland on Wheels, Car Audio and Electronics Magazine, 2000 Honda Odyssey, V14 N8, Aug. 2001, pp. 38-46.
Chuck Tannert, The Picture Show, Car Stereo Review, Apr. 1999, pp. 17-24.
Nissan Extends Quest Audiovox TV/VCD Entertainment System Offer, Apr. 27, 1999, The Auto Channel, www.theautochannel.com/news/press/date/19990426/press022335.html.
Panasonic Color LCD Monitor CY-VM1500EX Operating Manual, Matsushita Electrical Industrial Co. Ltd., YEFM283427 F0399-0.
Cross Roads Sports Series Minivans brochure, Undated.
Cherokee Chief Luxury Jeep Cherokee brochure, Undated.
Kelly Shaffer, This Humvee's Owner Makes Hot Sauce, Car Audio and Electronics, Mar. 2000, V13N3.
Mike Frost, DVD Test Report Drive-In Movie, pp. 38-42, Car Audio Electronics, Nov. 1999.
David Navone, Close to Home, Car Sound, Jan. 2000, http://www.ecoustics.com/Editorial/Reviews/Car_Multimedia_System_or_Mobile_Video/Recent_Date... Printed Jul. 16, 2004.
Internet Advertisement for Video Traveller Product Award, Feb. 4, 2001, http://www.emrkt.com/comtrad/videotraveler.html, Printed Aug. 18, 2005.
David Roznowski, Integration of Electronics Adds Value and Innovative Features In Concept Vehicle Interior from Johnson Controls, Detroit, Michigan, USA, Jan. 9, 2000.
Meritt Electronics, Video & TV Traveler, Car Audio and Electronics, p. 19, Jul. 1999.
Information Disclosure Statement submitted with this Form PTO-1449 describing items AS, AT, AU, and AV.
Harry F. Olson, "Gradient Loudspeakers" *Journal of the Audio Engineering Society, Loudspeaker Anthology* vol. 1: p. 304 (1973).
Jens Blauert, "Spatial Hearing" Second Edition MIT Press, Cambridge, Massachusetts (1983).
Chinese Office Action Dated Mar. 27, 2009, received on corresponding Chinese Application No. 200510089636.9.

* cited by examiner

REPRODUCING CENTER CHANNEL INFORMATION IN A VEHICLE MULTICHANNEL AUDIO SYSTEM

BACKGROUND OF THE INVENTION

For background, reference is made to U.S. Pat. Nos. 5,870,484, 5,333,200, 4,569,074, "Gradient Loudspeakers," Harry F. Olson, Journal of the Audio Engineering Society, Loudspeaker Anthology, Vol. 1, p. 304, and "Spatial Hearing," Jens Blauert, 2nd Ed., 1983, MIT Press, Cambridge, Mass.

SUMMARY OF THE INVENTION

According to the invention, a sound image is centered on a video display installed in a vehicle.

The signals presented to a listener's ears by the physical source or sources are consistent with signals that would be present at the listener's ears if a real, physical source of sound were actually located at the desired location. In an audio system used with a video display, loudspeakers displaced away from the location of the video display are arranged, and signals (which may be modified or processed) are applied to those loudspeakers that result in signals being presented to the listener's ears (the combination of the output from all sources reproducing the same signal information) that are consistent with signals that would be present at the listener's ears if a real, physical loudspeaker was located at the physical location of the video display.

The position of a phantom image may be controlled by controlling the intensity of sound radiated as a function of direction from a sound source. There are many methods for controlling the directivity of a sound source. One method uses an array of multiple, closely spaced transducers, where directivity control is maintained below the frequency whose wavelength is equal to twice the spacing between elements.

Accordingly, a signal transmitted by the array is propagated more in one direction than in another direction. According to one aspect of the invention, a video display is mounted in the center of a vehicle. Verbal dialog (e.g. contained in the center channel signal) reproduced by an array mounted on the right side of the vehicle is focused in a direction oriented toward the left side of the vehicle, and verbal dialog reproduced by an array mounted on the left side of the vehicle is focused in a direction oriented toward the right side of the vehicle. A vehicle occupant seated on the right side of the vehicle will be physically closer to the right array than the left array. A vehicle occupant seated on the left side of the vehicle will be physically closer to the left array than the right array. The directivity patterns of the arrays radiate less energy toward the closer seating location and more energy to the farther seating location. Use of directional arrays accomplish time intensity trading to simultaneously create for multiple asymmetrically located passengers, a perceived image located in the center of the vehicle near the video display. A particular advantage of arrays is the ability to control directivity of signals at low frequencies (e.g. 200 Hz.-1.5 KHz.)

The techniques according to the invention generate desired auditory cues at the listener's ears by manipulating the relative level and/or relative time delay of a signal reproduced that approximate cues that would be present at a listener's ears at lower frequencies, for virtual signal locations displaced between the pair of physical sound sources. The relative polarity, and/or relative phase as a function of frequency of a signal applied to multiple sources can also be manipulated to create perceived locations displaced outside of the space between the physical source locations. The invention contemplates auditory cues using crosstalk cancellation techniques and HRTF processing.

According to another aspect of the invention, the effective elevation of an audio source is adjustable so that the audio source will be perceived as being positioned at an elevation other than the actual speaker elevation. The perception of elevation of the signal may be changed by changing the spectral content of the transmitted signal.

Other features, objects, and advantages of the invention will be apparent from the following description read in connection with the accompanying drawing in which:

DETAILED DESCRIPTION

Figure 1:
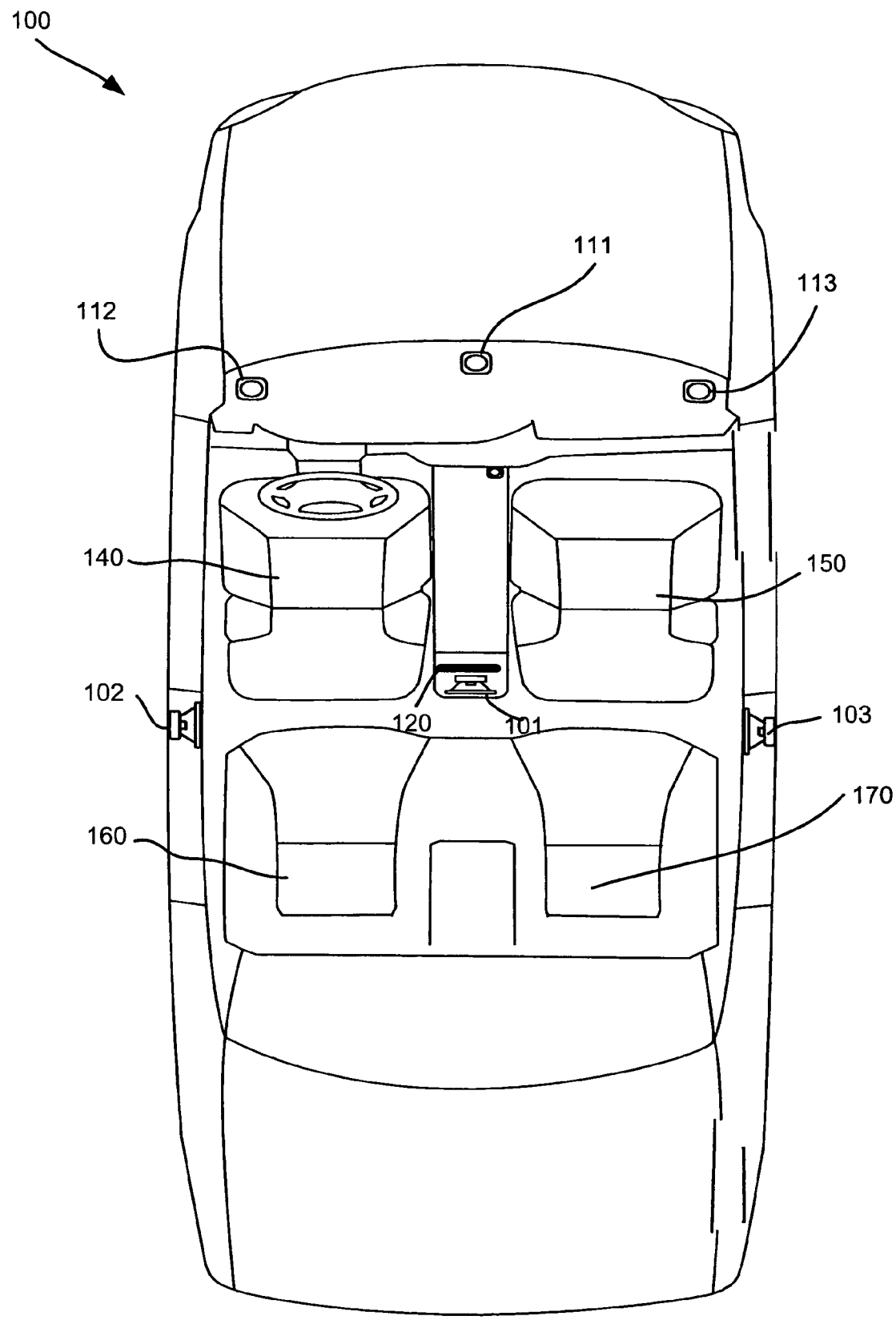
FIG. 1 shows a system for reproducing center channel information in a vehicle multichannel audio system, according to one embodiment of the invention.

With reference to the drawing and more particularly to FIG. 1, there is shown an audio system 100 for reproducing center channel information in a vehicle multichannel audio system. FIG. 1 includes a video display 120 mounted in the center of the vehicle (e.g. mounted in/on the ceiling of the vehicle), a center-mounted speaker 101, speakers 102, 103 mounted on the left and right side respectively of the vehicle near the rear seats 160, 170 and speakers 112, 113 mounted on the left and right side respectively of the vehicle near the front driver and passenger seats 140, 150 and speaker 111 mounted in/on the center of the front dashboard. The speaker 101 is mounted with the same azimuth as the video display 120 but is not co-located with the video display 120. The center-mounted speaker 101 may be mounted with an elevation different from that of the video display, for example, being mounted in a center console that is attached to the floor. The speakers 102, 103, 112, 113 are representative of other speakers that may be present in the vehicle. The actually number of other speakers present may be greater or less than the number of speakers shown.

When the elevation of the center-mounted speaker 101 is not the same as the elevation of the video display 120 (e.g. the center-mounted speaker 101 is mounted in a console and the video display 120 is mounted in the ceiling), a visual image depicted on the video display 120 may not completely perceptually fuse with the related auditory image and, as a result, the illusion that a person depicted on the video display 120 is actually speaking is degraded. It is possible to reduce this effect by processing the signal that is reproduced by the center-mounted speaker 101 in such a way that the reproduced signal is perceived as if it was physically at the same elevation as the video display 120.

Perception of the elevation of a sound source is primarily based on the spectral content of the signal heard by the listener. By changing the spectral content of the signal that a listener hears in a predetermined manner, the listener's perception of the location in elevation of the source of the signal can be changed. This is achieved by configuring a signal processing device (which may be analog or digital) to modify the spectral content of the signal applied to a loudspeaker and heard by the listener, where the signal processing applies a filter to the signal that represents the difference between a head related transfer function (HRTF) measured for a source located at the actual source location and an HRTF measured for a source located at the desired elevation. Methods to measure HRTF's are well known in the art. More particularly, the desired transfer function to be realized by the signal processing device can be determined according to the following steps:

In step 1, measure a first transfer function $H_1(j\omega)$, from the input to a sound source located at the elevation the source will actually be, to the sound pressure present at the listener's ears. In the example above, the source is located in a center floor mounted console and the listener is seated in seat 160 or 170.

In step 2, measure a second transfer function $H_2(j\omega)$, from the input to the sound source now located at the elevation the source is desired to be perceived to be, to the sound pressure present at the listener's ears. In the example above, the desired source location is the location of the ceiling mounted video display 120.

In step 3, compute a third transfer function $H_3(j\omega)$, by computing the difference between the first and second transfer functions, where:

$$H_3(j\omega)=H_2(j\omega)/H_1(j\omega)$$

Figure 11:
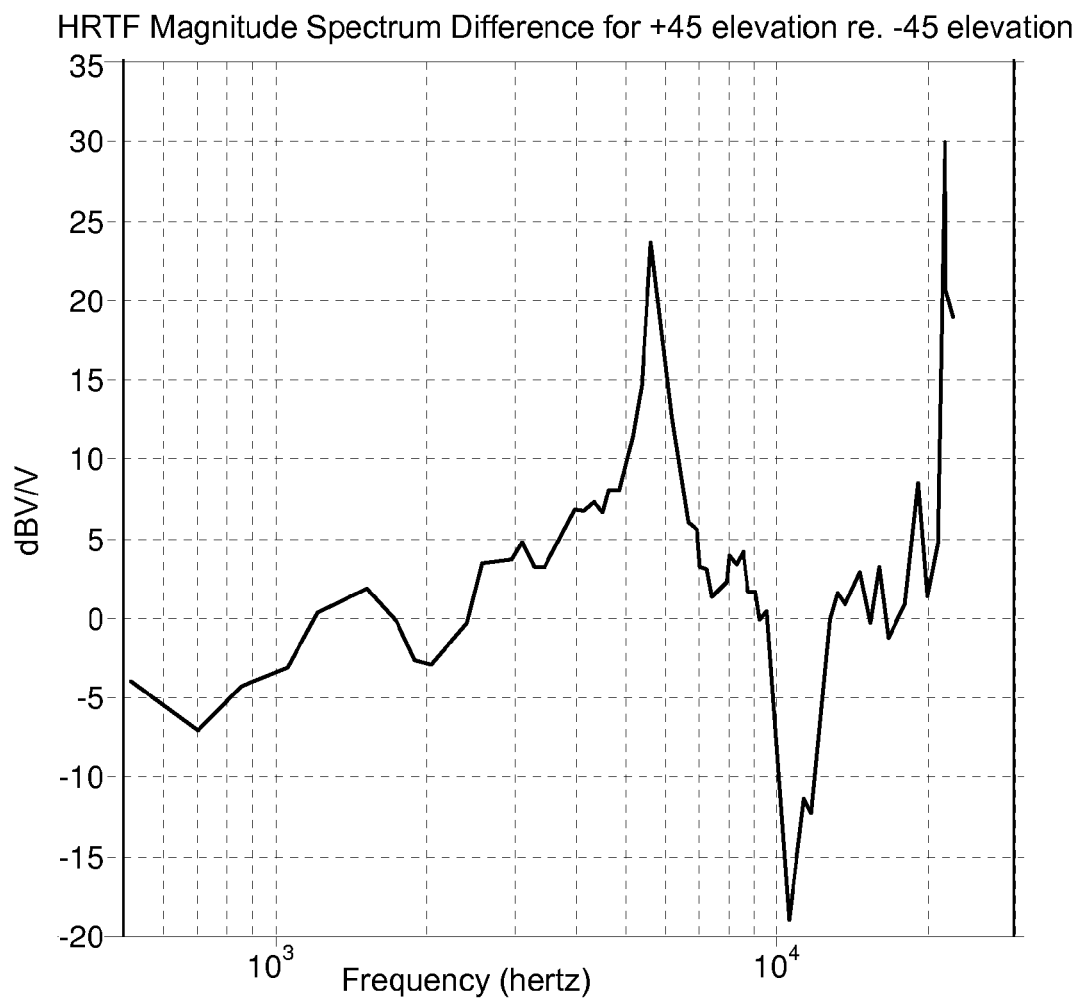
FIG. 11 is a transfer function of an exemplary equalizer.

A representative transfer function for an equalizer is shown in FIG. 11. This curve shows the difference in head related transfer function (HRTF) for a representative listener, comparing +45 degrees elevation to −45 degrees elevation. An equalizer placed in the signal path for a signal applied to a speaker located at −45 degrees azimuth with the transfer function shown will provide cues to a listener consistent with an actual source elevation of +45 degrees. An equalizer does not need to exactly follow the curve described in order to work effectively. Approximating the curve shape in the region approx. between 4 KHz and 14 KHz is sufficient. If different elevations are involved, the frequency of the peak (approx. 5.7 KHz in FIG. 11) and the frequency of the dip (approx. 11 KHz in FIG. 11) will shift. If it is desired to shift perception of elevation down rather than up, then a curve with characteristics that are the inverse of FIG. 11 would be sued. That is, to cause perception of an image to shift from a physical speaker located at +45 degrees elevation to a desired −45 degrees of elevation, an equalizer with a notch at 5.7 KHz and a peak at 11 KHz would be used.

In turn, by applying equalization with a transfer function of $H_3(j\omega)$ to the signal applied to a speaker positioned at an elevation different than the video display 120, the signal reproduced by the speaker will be perceived by a listener as having originated from a location at the elevation of the video display 120.

The information contained in the transfer function $H_3(j\omega)$ will be substantially concentrated at high frequencies. That is, the cues the auditory system uses to perceive the elevation of a sound source are concentrated at high frequencies. An alternative embodiment that has improved fusion of auditory and visual images can be accomplished by locating a high frequency sound reproduction source in the vicinity of a video display. A separate sound source for reproducing low and mid frequency information can be placed at a different elevation from the high frequency device. For example, in a multichannel audio system in a vehicle, high frequency center channel information is reproduced by a high frequency transducer (e.g. a tweeter) located near a video display (e.g. a ceiling or seat back mounted video display), while the rest of the spectrum of center channel information is reproduced by a low/mid frequency transducer (or combination of transducers) located at an elevation different from the elevation of the high frequency transducer. This embodiment allows flexibility in packaging, as only a small device need be located at the location of the video screen to provide adequate fusion of perceived auditory and visual images.

Figure 2:
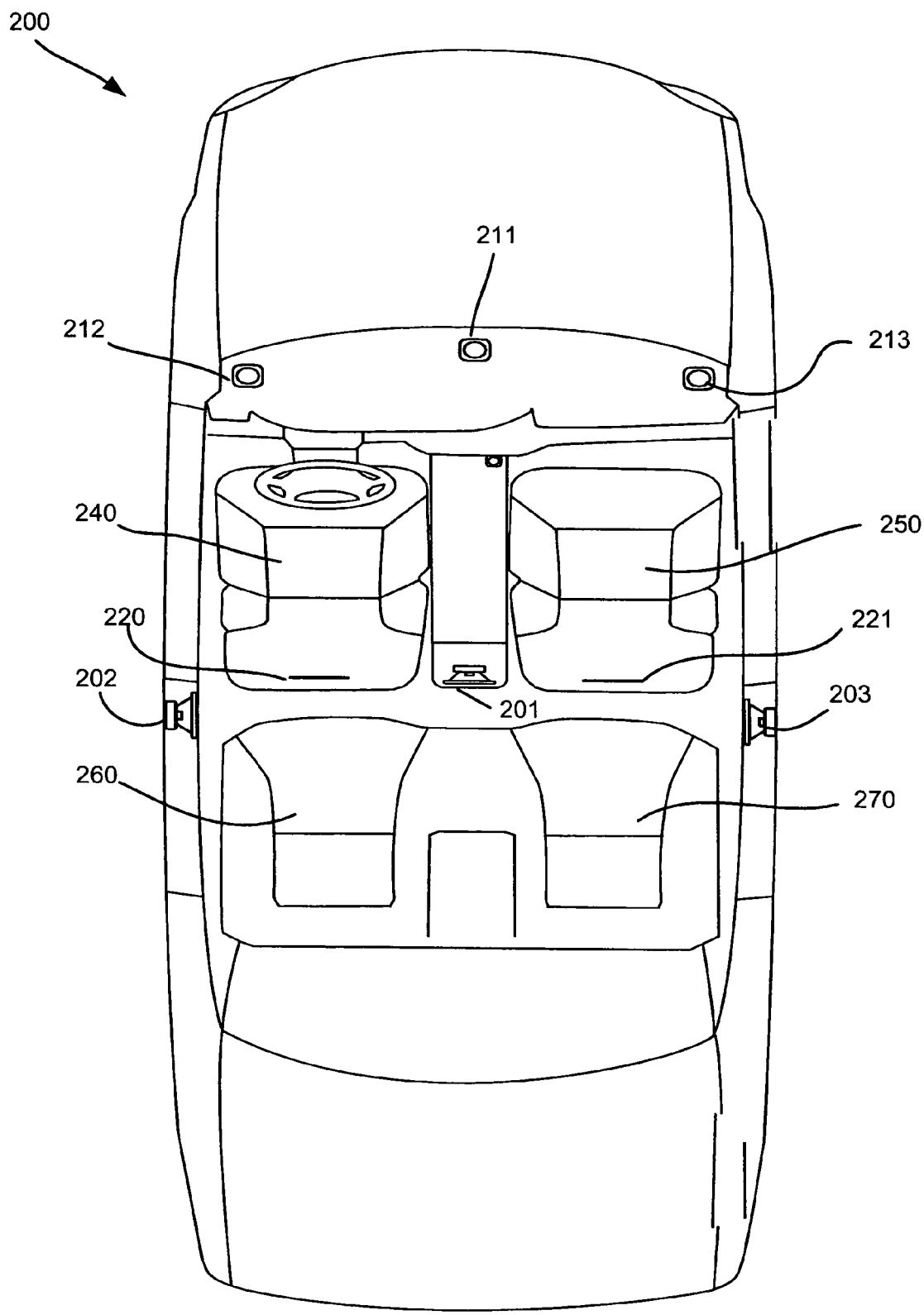
FIG. 2 shows an alternative configuration of the system for reproducing center channel information of the vehicle multichannel audio system.

FIG. 2 shows an alternative audio system configuration 200 that includes a center-mounted speaker 201, two (left and right) video displays 220, 221 mounted in positions that are behind and in line with each of two (left and right) front seats 240, 250 respectively (e.g. in backs or headrests of seats 240 and 250), a speaker 211 located in the center of the dashboard, two (left and right) speakers 212, 213 mounted to either side of the dashboard and two speakers (left and right) 202, 203 mounted to either side of the vehicle, for example, mounted in pillars, sidewalls or doors, etc. of the vehicle. In this configuration, the rear passenger seats 260, 270 are positioned in line with each of the two video displays 220, 221.

The center-mounted speaker 201, could, according to one embodiment of the invention, be mounted in a console in the center of the vehicle. It could also, according to other embodiments of the invention, be mounted anywhere on the centerline of the vehicle. Because there is no speaker located at the same azimuth as the video displays 220, 221 with respect to each of the passenger seats 260, 270 to provide center channel information, it is desirable to create a phantom image of the center channel information that will be perceived to be near each of the video displays 220, 221. Phantom images rely on a phenomenon called summing localization whereby the same signal is transmitted from two (e.g. or more) sources that are displaced in azimuth whereby the listener perceives location of the phantom image as being positioned somewhere between the locations of the sources depending on the relative intensity of the signals transmitted from the sources and the relative time delay of the signals transmitted from the two sources. The speakers 202, 203, 212, 213, as described, may simultaneously transmit other signals (e.g. speakers 202, 212 transmit left channel signal and speakers 203, 213 transmit right channel signals of a stereo or multi-channel audio system). The speakers 202, 203, 212, 213 are representative of other speakers that may be present in the vehicle. The actually number of other speakers present may be greater or less than the number of speakers shown. Processing of the center channel signal can be performed independently of the processing done on other signals.

The position to which a designated signal will be localized depends upon the signals present at a listener's ears due to the number, position, and characteristics of all of the sources that reproduce the designated signal (e.g. speakers, etc.), and any signal processing that may be applied to the signal. In the rear of the vehicle 200, center channel information is reproduced by speaker 201. Additionally, in order to create a phantom image of center channel information in the vicinity of video displays 220 and 221, center channel information is fed to speakers 202 and 203. By reproducing center channel information from loudspeakers arranged in a symmetric fashion about the center-line of the vehicle, it will be possible to create desired phantom images for both left and right rear seat passengers simultaneously.

Due to the symmetry, it is straightforward to adjust the relative level and relative delay of the signals applied to speakers 202 and 203 with respect to the level and delay of the signal applied to speaker 201, in order to achieve the desired effect. It should be noted here that although relative levels and delays of applied signals are discussed, this is for convenience. The real quantity of interest is the relative sound pressure level at the listener's ears due to each sound source reproducing a particular signal. Relative levels of applied signals are discussed with the assumption that the gain in the rest of the signal chain (including any amplifiers and loudspeaker to listening location transfer function) are equal, so that when it is stated that a relatively larger signal is applied as compensation, what is meant is that the signal level is adjusted such that the sound pressure at the listener's ears due to the source receiving the increased level signal is made to be relatively larger than the sound pressure at the listener's ears due the other source or sources used for the relative comparison.

Increasing the level of signals applied to speakers 202 and 203 with respect to the signal applied to speaker 201 will cause the phantom image to shift away from speaker 201 toward speakers 202 and 203, for left rear seat 260 and right rear seat 270 passengers respectively. Delaying the signal to the center mounted speaker 201 with respect to the signals applied to speakers 202 and 203 also causes the phantom image to shift away from speaker 201 toward speakers 202 and 203, for left and right rear seat passengers respectively. Proper choice of relative level and/or relative delay can effectively position a phantom image in the vicinity of video displays 220 and 221. Relative level and relative delay adjustments can be used alone or in combination to achieve the desired result. The exact processing will depend on the specific arrangement of system components in a vehicle. The level of center channel signal applied to speakers 202, 212, 203, 213 may be lower, equal to, or greater than the level of signal applied to speaker 211, 201 depending on particular characteristics of the vehicle and sound reproduction components used. The level of center channel signal applied to speakers 212, 213 relative to the level applied to speaker 211 may be different than the level of center channel signal applied to speakers 202, 203 relative to the level applied to speaker 201. Similarly, signals to speakers 201, 211 may be delayed with respect to signals to speakers 202, 212, 203, 213 or the reverse may be true. The delay of signals applied to speaker 201 relative to the delay of signals applied to speakers 202, 203 may be the same or different from the delay of signals applied to speaker 211 relative to the delay of signals applied to speakers 212, 213. The actual delays chosen will also depend on the particular characteristics of the vehicle (such as path lengths from each speaker to the listening location) and sound reproduction components chosen. It should be noted in the above discussion with respect to relative delay that a relative delay can be created by delaying one signal with respect to another, where only one signal has an actual time delay applied in associated signal processing, or by delaying both signals by differing amounts.

One possible method for determining relative levels and delays for the rear seat passengers will be described. For one example method, assume first that center channel information is only presented to speaker 201. In this case, center channel information will be perceived to be at the location of speaker 201. It is desired that center channel information be localized at the location of video displays 220 and 221. To accomplish this, center channel information is also applied to speakers 202, and 203. The level of center channel information applied to speakers 202 and 203 is increased until listeners seated in seats 260 and 270 perceive the location of the center channel information to approximately coincide (at least with respect to azimuth) with the video display locations 220 and 221 respectively.

The above discussion has not considered the front seat. It may be desirable for center channel information in the front seat to be localized to the location of speaker 211, which is straightforward to accomplish (by only applying center channel information to speaker 211). Alternatively, it may be desirable to create a phantom image for center channel information for each front seat occupant that is displaced away from the centerline of the vehicle, to the left and right for driver and passenger respectively (one embodiment locates the phantom images directly in front of the driver and front seat passenger locations). This can be accomplished in the front seat using the same method described above for the rear seat. Accordingly, center channel signal can additionally be applied to speakers 212, 213 to shift the perceived location of the center channel signal as desired.

It is possible that reproducing center channel information with speaker 201 (and possibly speakers 202 and 203) will affect where front seat passengers localize center channel information. Outputting center channel information from speaker 201 (and/or speakers 202, 203) could cause the perceived location of center channel information for front seat occupants to be displaced towards the rear of the vehicle, away from the desired location in front of the vehicle. To compensate for this, delay can be added to the center channel signal applied to speaker 201 (and speakers 202, 203 if necessary) to ensure that center channel information arrives in front seats 240 and 250 first from speaker 211 (and also possibly speakers 212 and 213), before it arrives from speaker 201 (or speakers 202 or 203).

Adding delay to the center channel information applied only to speaker 201 to move the perceived image for front seat occupants back towards the front of the vehicle will cause the phantom image for listeners located in left rear seat 260 and right rear seat 270 to shift further towards speakers 202 and 203 respectively. To move the phantom image for rear seat occupants back to the desired locations, either the level of center channel signal applied to speakers 202 and 203 could be reduced, delay could be added to the center channel signals applied to speakers 202 and 203 relative to the signal applied to speaker 201, or a combination of delay and level adjust could be applied.

In an embodiment where there is not good left/right symmetry about the centerline of the environment, such as may occur in the front seating area of a vehicle where the dash area around the driver may have a different geometry than the dash area around the passenger, it may be desirable to individually adjust relative levels and delays of signals (e.g. center channel signals) applied to each speaker that it is determined should reproduce the signal, to achieve a desired effect. That is, the relative level and delay of center channel signal applied to speaker 212 with respect to the level and delay of center channel signal applied to speaker 211 may be different from the relative level and delay of signal applied to speaker 213 with respect to that applied to speaker 211.

Figure 3:
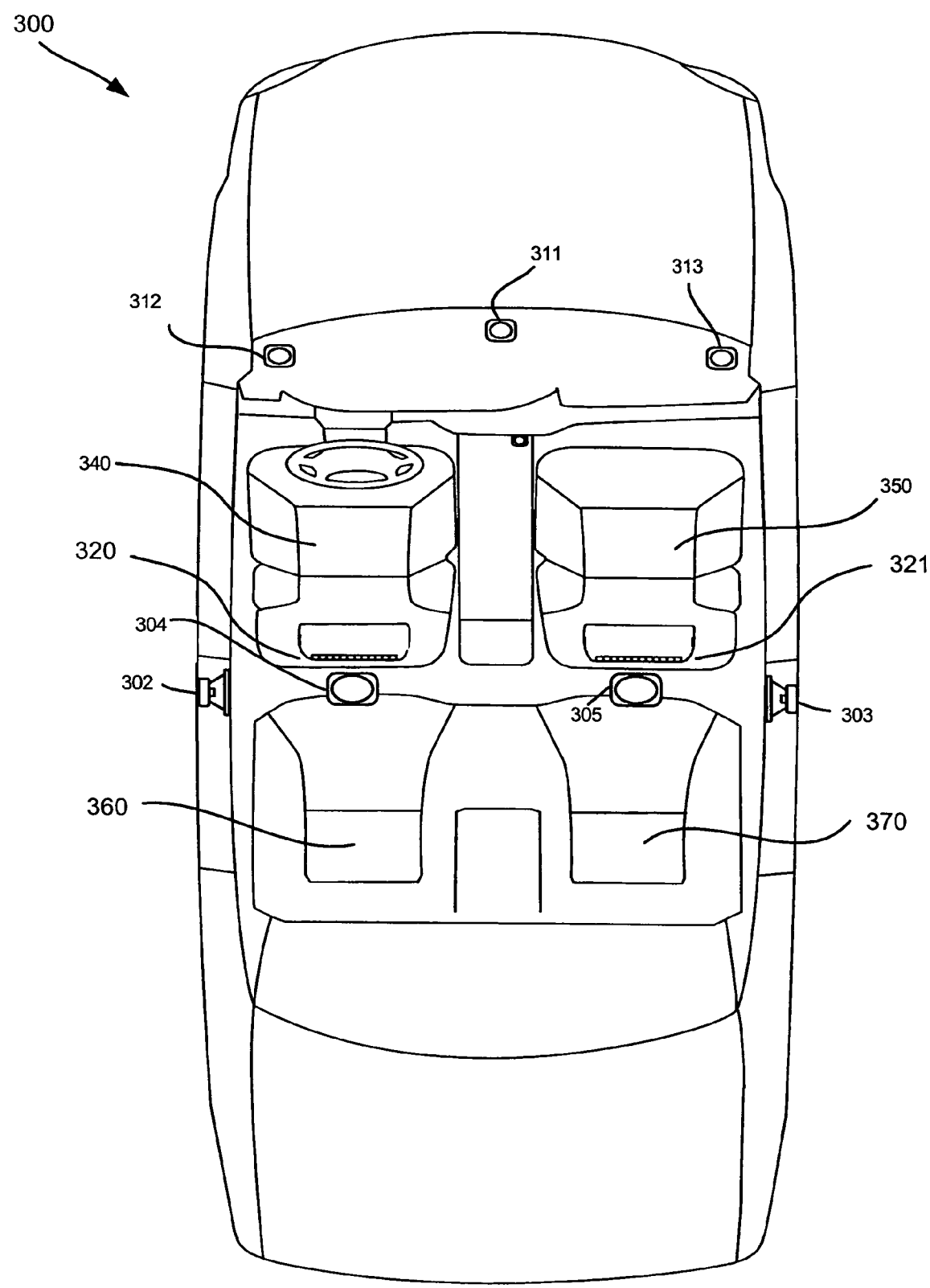
FIG. 3 shows an arrangement in which speakers from a multichannel audio system are positioned near video displays installed in the headrests of vehicle front seats.

FIG. 3 is diagram depicting an arrangement in which speakers from a multi-channel audio system are positioned near video displays installed in seat backs or in the back of headrests of vehicle front seats, according to one embodiment of the invention. FIG. 3 includes front (i.e. left and right) seats 340, 350, each having the video displays 320, 321, rear seats 360, 370, left and right speakers 304, 305 mounted in the ceiling of the vehicle (e.g. the left and right speakers 304, 305 may alternatively be located in other positions near the video displays 320, 321, such as in the seat backs). The video displays 320, 321 may alternatively be mounted in the ceiling of the vehicle. FIG. 3 also includes left, right and center front speakers 312, 313, 311 respectively, mounted in the dashboard and left and right speakers 302, 303 mounted to the side and in front of left and right rear passenger seats 360, 370 respectively. Speakers 312 and 313 could alternatively be mounted in the sides of the vehicle rather than in the dash.

In this configuration, the left and right speakers 304, 305 in the ceiling are located at approximately the same azimuth as each of the video displays 304, 305. In FIG. 3 they are shown as located slightly rearward of the location of video displays 304, 305, however, they may be located in line with or even slightly forward of the display location. Both the left and right speakers 304, 305 are configured to transmit a signal with center channel information. Accordingly, the listeners seated in either of the rear seats 360, 370 will hear a combination of the signals transmitted by the left and right speakers 304, 305 wherein the phantom image perceived by a listener in either seat will be pulled slightly toward the center of the vehicle, due to the center channel information transmitted from a speaker 304, 305 from the opposite side of the vehicle (e.g. the passenger sitting on the left side of the vehicle will perceive a phantom image that has been pulled closer to the center of the vehicle because of the effect of the center channel information transmitted by the speaker 305 on the right side of the vehicle).

To compensate for the phantom image being pulled closer to the center of the vehicle it is desirable to bleed a small amount of center channel information into left and right speakers 302, 303. Doing so balances the transmission of center channel information such that the resulting perceived location of the phantom image is moved closer to being inline with the location of the video display.

For an embodiment where speakers 304, 305 are located in the ceiling, the speakers will be at a different elevation than the video display. Similar signal processing to what was described earlier in FIG. 11 can be applied, to cause the perceived image to shift down in elevation to better align with the display location. In this case, the shape of the equalization applied will have an inverted character to that of FIG. 11.

Figure 4:
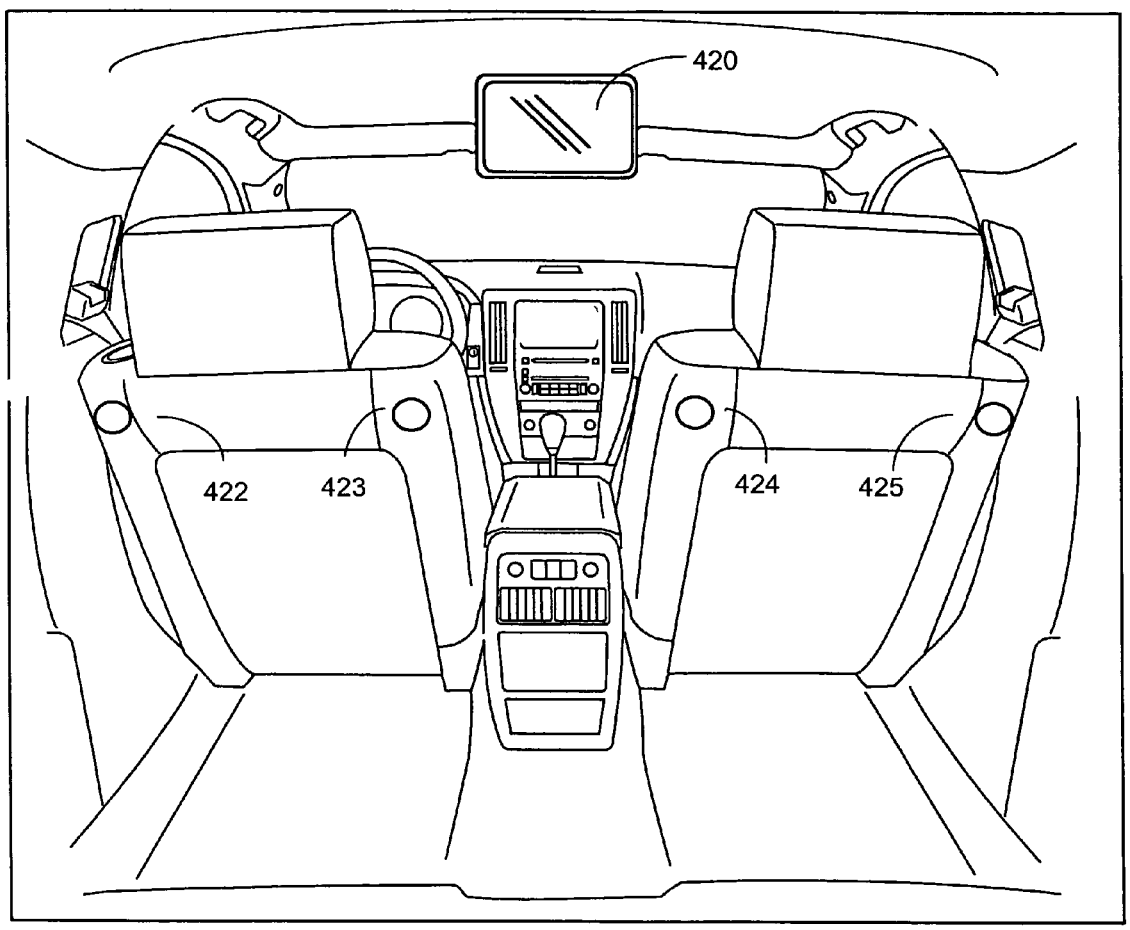
FIG. 4 shows an alternative embodiment of the invention in which the speakers and video display are mounted to the rear of the vehicle front seats.

FIG. 4 is a diagram depicting an alternative embodiment of the invention in which speakers 422, 423, 424, 425 are mounted to the left and right side each front seat back. Video display 420 is mounted in the ceiling, in line with or slightly rearward of the two front passenger seats 440, 450. The left channel and center channel signals of a multi-channel sound system are transmitted by the left and right speakers 422, 423 respectively, of the left front passenger seat 440. The center channel and right channel signals of the surround sound system are transmitted by the left and right speakers 424, 425 respectively, of the right front passenger seat 450. The perceived location of the center channel signal will be slightly to the right of right speaker 423 for the left rear seat passenger, due to the center channel signal radiated by speaker 424, and perceived location of the center channel signal will be slightly to the left of left speaker 424 for the right rear seat passenger, due to the center channel signal radiated by speaker 423, where each of the perceived image locations will be approximately in line with the azimuth of video display 420. This arrangement of loudspeakers is referred to as L-C-C-R. Other speakers may also be used along with this configuration. For example, speakers could be located in left and right rear doors if desired (not shown).

Figure 5:
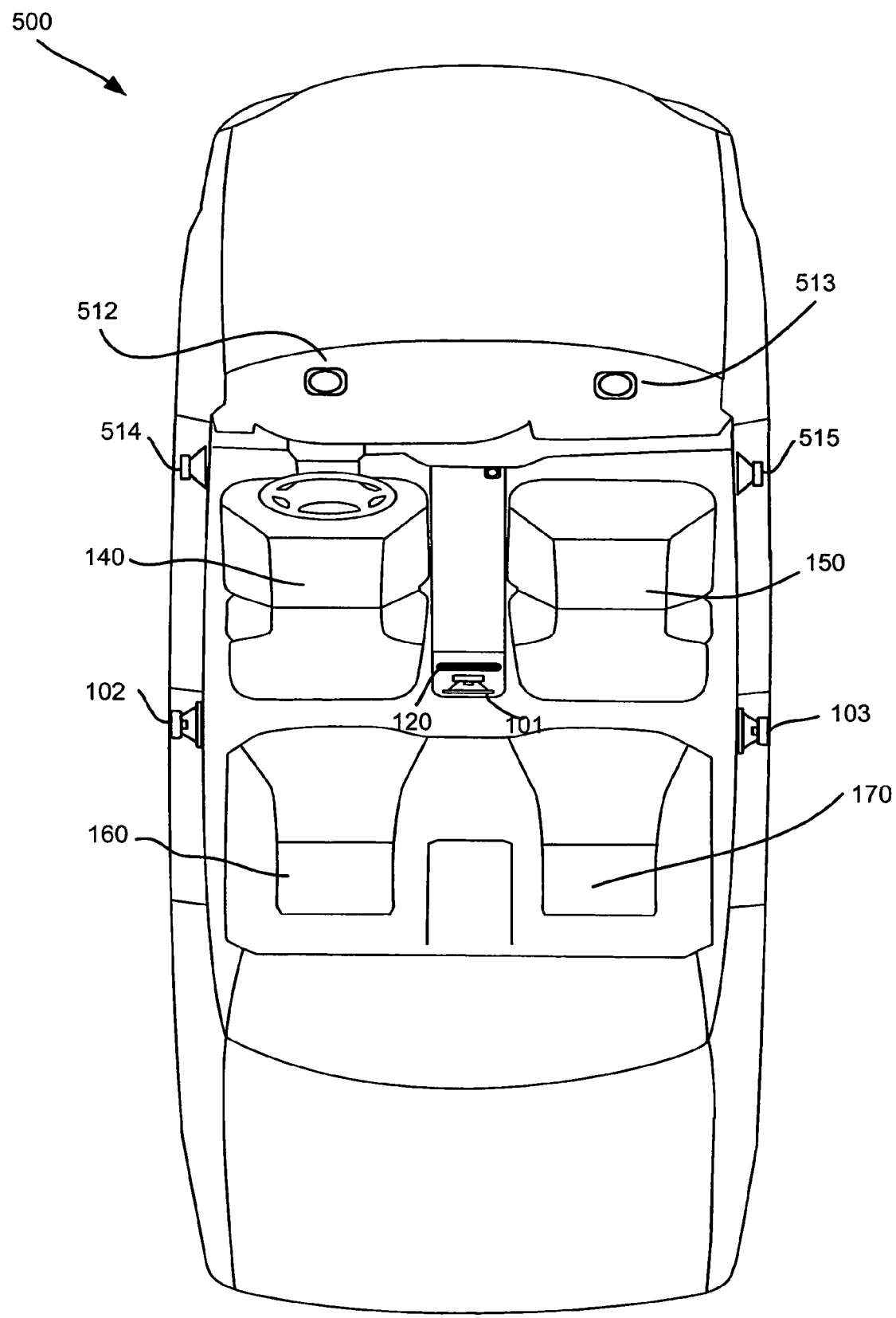
FIG. 5 shows an alternative embodiment of the invention in which the speakers are positioned near a center-mounted video display.

FIG. 5 is a diagram depicting an alternative embodiment of the invention in which the speakers and video display (if present, not shown in FIG. 5) are mounted in the dashboard. The embodiment of FIG. 5 shows an L-C-C-R arrangement of speakers disposed in the front of the vehicle, similar to the arrangement previously described in FIG. 4 with respect to the rear seat passengers. Accordingly, there is a speaker 512 mounted in the dashboard in front of the left seat passenger, a left speaker 514 mounted on the left side of the vehicle, a speaker 513 mounted in front of the right seat passenger and a right speaker 515 mounted on the right side of the vehicle. A video display could be centrally placed in the dash, or a pair of displays could be displaced to the left and right of the vehicle center line. The left channel and center channel of a surround sound signal are transmitted by the left speaker 514 and left dashboard mounted speaker 512 respectively. The center channel and right channel of the surround sound signal are transmitted by the right dashboard mounted speaker 513 and right speaker 515 respectively of the right front passenger seat 550. In this embodiment, center channel information is radiated directly to each front seat passenger by speakers 512 and 513. Phantom image methods are not required to achieve a perceived location for center channel signals in front of each front seat occupant. This arrangement has also proven to be beneficial in music only reproduction where no video display is present.

Figure 6:
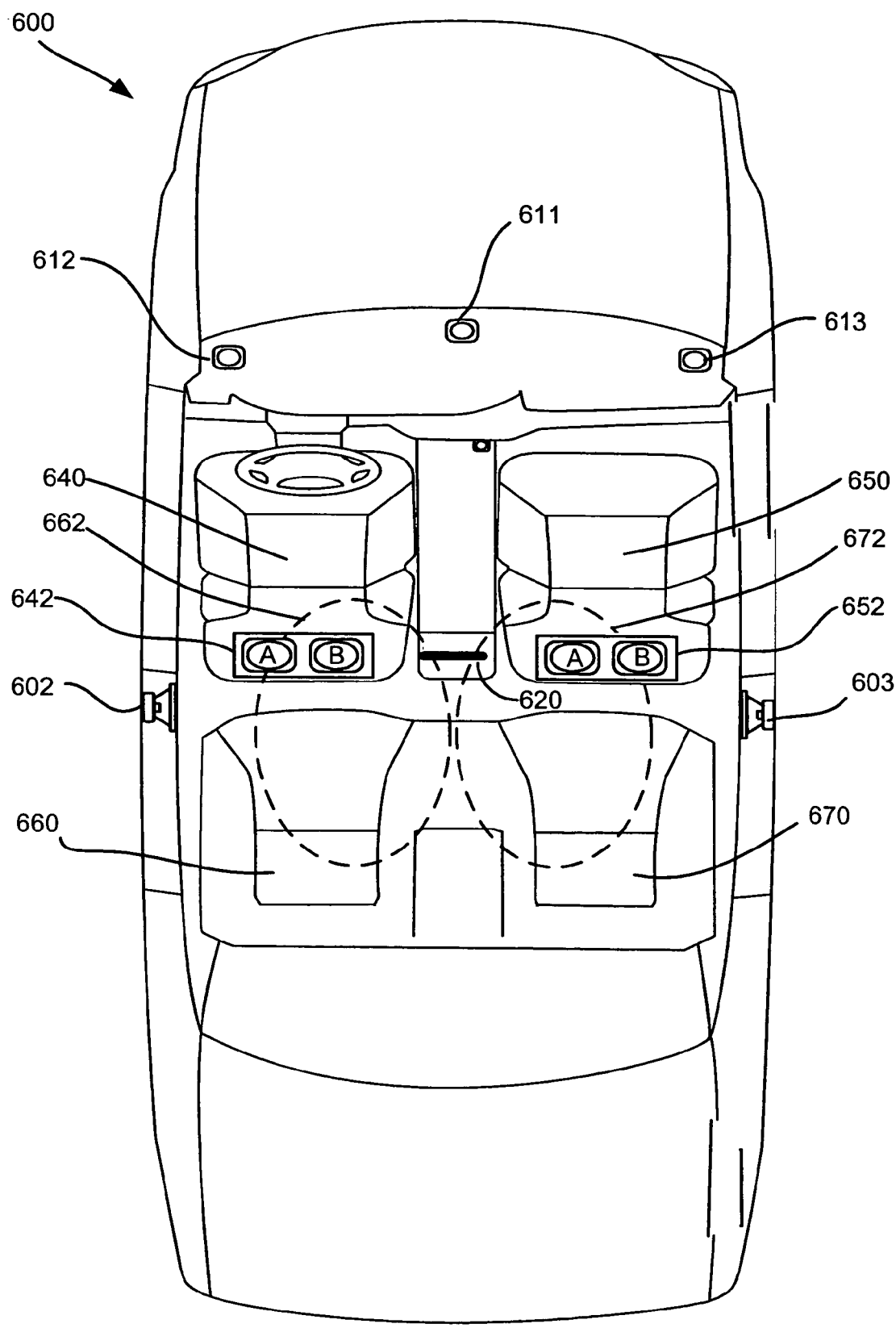
FIG. 6 shows another embodiment of the invention.

FIG. 6 is diagram depicting an alternative embodiment 600 of the invention. FIG. 6 includes left and right front seats 640, 650, left and right rear seats 660, 670, and left and right directional loudspeakers 642 and 652. In the embodiment depicted in FIG. 6, each directional loudspeaker consists of a pair of transducers (e.g. sometimes referred to as arrays) positioned to the left and right of center-mounted video screen 620. Arrays can have more than two transducers if desired. Directional loudspeakers need not be formed using arrays, however. Any known method for constructing a loudspeaker that radiates relatively more energy in one direction than in other directions, over a useful portion of the audio frequency spectrum, may be used as a directional speaker. For example, a horn tweeter or a transducer with a sound radiating surface that is large compared the wavelength of sound being reproduced are directional speakers. For purposes of illustration, the following discussion will refer to use of arrays as directional loudspeakers. Arrays have particular advantage, as it is possible to achieve desired directional behavior at low frequencies, where it would otherwise require large physical structures to accomplish.

In the embodiment of FIG. 6, the arrays 642, 652 are mounted in or on the seats 640, 650. Alternatively, the arrays 642, 652 could be mounted in other locations that are displaced to the sides of the video display, in the same or different elevation as the video displays 620 (e.g. in the ceiling or floor, for example). Left array 642 radiates more energy toward the right side of the vehicle than the array 642 radiates forward. Consequently there is a greater amount of sound that is output in the direction of right seat 670 from the left array 642 than there is sound output either straight ahead or in the direction of the left seat 660 as depicted in FIG. 6. Conversely there is a greater amount of sound that is output in the direction of the left seat 660 from the right array 652 than there is sound output either straight ahead or in the direction of the right seat 670 as depicted in FIG. 6. This effect will tend to keep a sound image from both arrays 642, 652 centered along the center line of the vehicle for both listeners in the rear seats 660, 670 simultaneously.

The directivity described compensates for the relative time of arrival difference from each directional speaker to the seating locations. Sound from left array 642 will arrive at seat 660 before sound from right array 652 will arrive at seat 660, if the same signals are applied to each array. The relative time difference would normally cause a listener in seat 660 to perceive the location of the signal presented (as described above) to be closer to left array 642 than right array 652. Similarly, a listener in seat 670 would perceive the location of the signal presented as being closer to right array 652 than left array 642. The directivity patterns of the arrays are chosen to compensate for the relative time difference, exploiting time-intensity trading techniques. In seat 660, sound from array 642 arrives before sound arrives from array 652, but the directivity of the arrays is designed such that the level of sound received in seat 660 from directional speaker 642 is lower than the level of sound received from directional speaker 652, thus displacing the perceived location of center channel signal radiated (from by the system from both arrays) moves toward the location of video display 620. Simultaneously, the array directivity shifts the perceived location for center channel information of a passenger seated in seat 670 to shift toward the location of video display 620.

These techniques can be used in multi-channel audio systems in which there are separate left, center, right, left surround and right surround signals, for example. The techniques may also be used in connection with stereo systems. In a stereo arrangement, left channel information may be radiated by array 642 and right channel signal is radiated by array 652. The directivity of the arrays is chosen such that when the same signal is equally present in both channels, each passenger will perceive the location of this signal to be approximately centered between the two directional arrays. In a stereo system or two channel matrixed surround sound system (e.g. Dolby or other surround encoded 2 channel system), dialog information may be included in both stereo signal channels.

Unlike speakers that are best able to affect control of signal directivity at higher frequencies, arrays are able to control directivity at low frequencies, including a range of frequencies between 200 Hz. and 1.5 KHz. The 200 Hz.-1.5 KHz frequency range is an important range for controlling listener perception of the location of sound images, and control over a substantial portion of this frequency range is useful for controlling localization of images in the embodiments described herein. The directivity control provided by arrays make it feasible to simultaneously create separate, stable center image sound configurations for each one of multiple rear seat passengers.

The frequency range over which directivity control can be maintained is in large part determined by the spacing between array elements. The highest frequency of useful control is the frequency whose wavelength is twice the element spacing. Above this frequency, multiple lobes in directional patterns begin to occur. To control directivity up to 1.5 KHz, the element spacing should be on the order of 4.5 inches. Element spacings larger than 4.5 inches can still provide acceptable directivity control, and may be useful in some embodiments. For example, control to 1 KHz is achieved with approximately 7 inch element spacing, and this has also been found to be sufficient.

Arrays achieve directivity modification at low frequencies through the use of destructive interference. Specific signal processing can be applied to achieve desired directivity patterns. The signal processing is described in more detail in FIGS. 7 and 8, which are described below.

Figure 7:
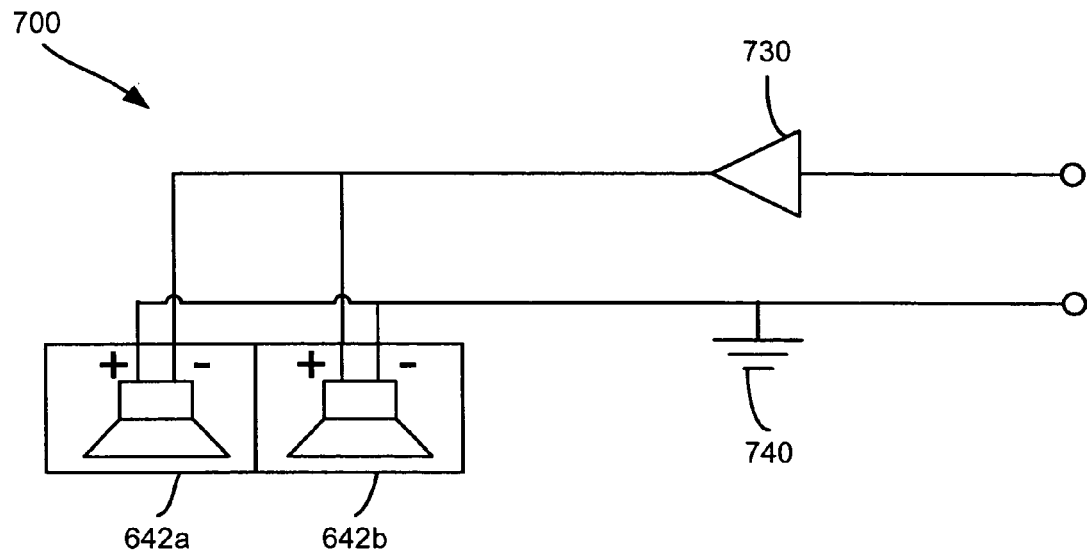
FIG. 7 is a circuit diagram for connection of an array, according to one embodiment of the invention.
Figure 8:
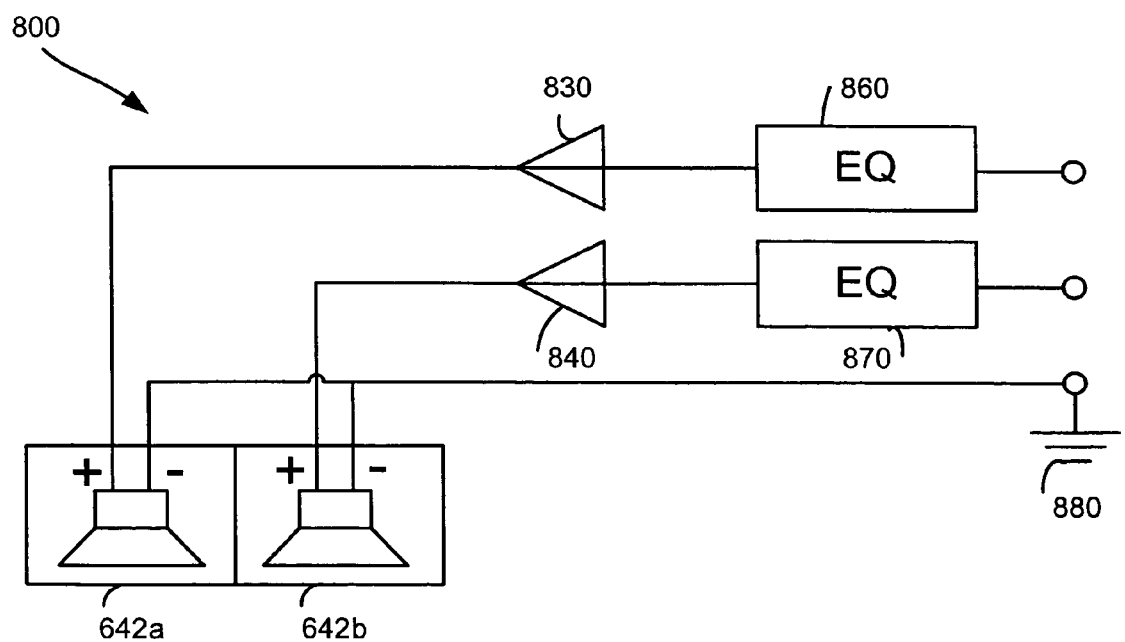
FIG. 8 is an alternative circuit diagram for connection of an array, according to an embodiment of the invention.

Arrays 642 and 652 may employ either simple or more complex techniques to achieve useful directivity. FIGS. 7 and 8 describe signal processing useful for two element arrays as shown in FIG. 6 (e.g. arrays 642, 652 positioned in the left seat 640 and right seat 650 contain left and right transducers 642a, 642b, 652a, 652b respectively). FIG. 7 is a circuit diagram 700 for connection of an array 642, according to one embodiment of the invention. One embodiment simply inverts the relative polarity of transducers 642a, with respect to 642b, and 652a with respect to 652b in each array 642, 652 respectively. In one embodiment, transducers 642b and 652a have non-inverted polarity and transducers 642a and 652b have inverted polarity. Each array 642, 652 will then have a dipole radiation pattern, with maximum radiation directed along the line joining the centers of the two transducers, and minimum radiation in a direction orthogonal to the maximum radiation direction. The arrays 642, 652 are arranged such that the closer listener is located closer to or in the "null" of the array, while the listener on the opposite side of the vehicle is located closer to or in the direction of maximum radiation. For example, a passenger in seat 660 will be in or close to the null of array 642, and will be closer to the maximum radiation direction for array 652. This level difference is used to shift perceived location of a signal simultaneously radiated by each array away from the closer array towards the farther spaced away array. One benefit to this arrangement is that only one amplifier 730 is required (the electrical connection to individual transducers can be inverted as needed to change relative polarity).

In some applications, the relative level difference generated by the simple dipole directional speaker arrangement described above may be greater than what is needed. An improvement on this method, still using only a single amplifier 730, attempts to reduce the depth of the null by changing the sensitivity of transducer 642a with respect to 642b or 652a with respect to 652b of the arrays 642, 652. This can be done by changing the voice coil of one transducer (the impedance of one coil can be made higher or lower relative to the other, to create a voltage sensitivity difference between the two transducers). In one embodiment, two transducers are used where one has a 2 ohm nominal DC resistance and the other has an 8 ohm nominal resistance. It is well known how to scale the impedance of a transducer without substantially changing its response as a function of frequency. When the array is driven by a single amplifier 730, the higher impedance transducer has lower output than the lower impedance transducer. The array no longer has a figure of eight pattern, and the relative level difference between level at seat 660 and seat 670 is reduced. In one embodiment, speakers 642a and 652b have higher impedance voice coils than speakers 642b and 652a respectively. Alternatively, a resistor could be placed in series with one of the transducers of each transducer pair to reduce its output.

FIG. 8 is an alternative circuit diagram 800 for connection of an array, according to one embodiment of the invention. Any desired first order gradient directivity pattern can be created (from a 2 element array). Arrays achieve directivity at low frequencies (e.g. frequencies with wavelengths large compared to the element spacing) through the use of destructive interference. That is, signal processing is applied to cause the outputs of the individual array elements to interfere destructively, where the extent of the destructive interference varies as a function of angle. EQ blocks 860 and 870 represent signal processing necessary to control directivity in a representative two element array. As described with regard to FIG. 7, relative polarity and relative level can be used to achieve useful directivity. Additional flexibility is obtained if additional control is available. In the embodiment of FIG. 8, EQ blocks 860 and 870 allow control over relative level of signals applied to each element as a function of frequency, relative phase as a function of frequency, and relative time delay for signals applied to array elements 6452a and 642b.

In FIG. 7, inverting the polarity of the elements of a two element array was described. The embodiment described in FIG. 7 has a dipole radiation pattern. To shift the angle at which the nulls appear in the array, the relative time delay of signals applied to each element of the array can be adjusted. For example, if time delay is added to the signal applied to element 642a with respect to 642b, the nulls in the radiation pattern will be rotated toward the left of the array. A cardioid pattern (which is one possible first order gradient pattern) is obtained when the time delay is set to be the amount of time it takes for sound to travel a distance equal to the element spacing (and elements have inverted polarity and equal output levels). In this case, a single null will occur, and will be oriented in the direction of a line starting at the center of the array and pointing toward the element that was delayed (642a). Maximum radiation will be in a direction 180 degrees opposite the single null location. Rather than applying simple time delay (and polarity inversion if necessary), more complex equalization may be used where the relative level and phase as a function of frequency are controlled to achieve a specific radiation patterns. A radiation pattern that varies as a function of frequency can be obtained by varying relative level and phase as a function of frequency. Additional equalization can be applied to compensate for the frequency response effects associated with creating destructive interference.

Furthermore, it is possible to radiate different signals in different directions simultaneously from the same array as in the commercially available Bose 3-2-1 system incorporated by reference herein. For example, center channel information could be radiated in a direction towards the middle of the vehicle from arrays 642 and 652. Simultaneously, left front channel signals (in a multi-channel surround sound system) may be radiated either straight ahead toward seat 660, or towards the left side of the vehicle by array 642 while right channel signals may be radiated either straight ahead toward seat 670, or towards the right side of the vehicle by array 652. Additional signals can be radiated as well, each with their own radiation pattern.

The pair of transducers 642a, 642b or 652a, 652b used in arrays 642 and 652 can be used in another way to achieve desired placement of perceived images. Signal processing can be applied to the array elements in order to gain control over the signals that are presented to the user's ears. These techniques are generally applicable when the exact location of a listener is known. One method to achieve this control is to use crosstalk cancellation and HRTF processing methods. Crosstalk cancellation and HRTF processing methods applicable to home audio systems are well known in the art.

Crosstalk cancellation allows a system using loudspeakers located out in space (as opposed to headphones) to independently control the signals presented to each of the listener's ears. (Headphones inherently allow independent control over the signals at each ear.) Crosstalk cancellation essentially affords a "headphone like" control over signals presented to each ear, when using loudspeakers located out in space. Once control of the signal at each ear of the listener is achieved, HRTF based filtering can be applied to generate the desired auditory cues. For example, for a listener seated in seat 660, crosstalk cancellation and HRTF filtering are applied to a center channel signal for reproduction by array 642 to produce desired left ear and right ear signals at the listener's ears that are consistent with cues that would be present at the listener's ears if a real source of sound were located in the center of the vehicle at the location of video display 620. It is straightforward to produce cues at the listener's ears that would be consistent with a source located at any azimuth using these techniques. It is also possible to simultaneously process different signals with different sets of HRTF filters, and reproduce them simultaneously from the array. For example, center channel signals may be HRTF filtered to cause a listener to localize center channel information at the location of video display 620, while a left channel signal is HRTF processed so that it is perceived to be located at an azimuthal location angled to the left (e.g. 30 degrees to the left of the line bisecting the centers of seats 660 and 640, or any other desired angle). These signals, or others, can be reproduced simultaneously from array 642. Similar processing can be applied to R, and center signals that are applied to array 652. The left and right channel HRTF signal processing may be the same for arrays 642 and 652, however the processing for center channel information needs to be slightly different. For array 642, center channel information should be localized to a position that is to the right of the array, while for array 652, center channel information should be localized to a position to the left of the array.

The restriction on element spacing described earlier for a directional array does not hold when the array is used for HRTF processing. Any array spacing can be accommodated. However, embodiments with closer element spacing allow a listener to move around in a larger area without significant degradation of the desired perception.

HRTF processing can also be combined with directional loudspeakers as in the aforesaid 3-2-1 system.

Figure 9:
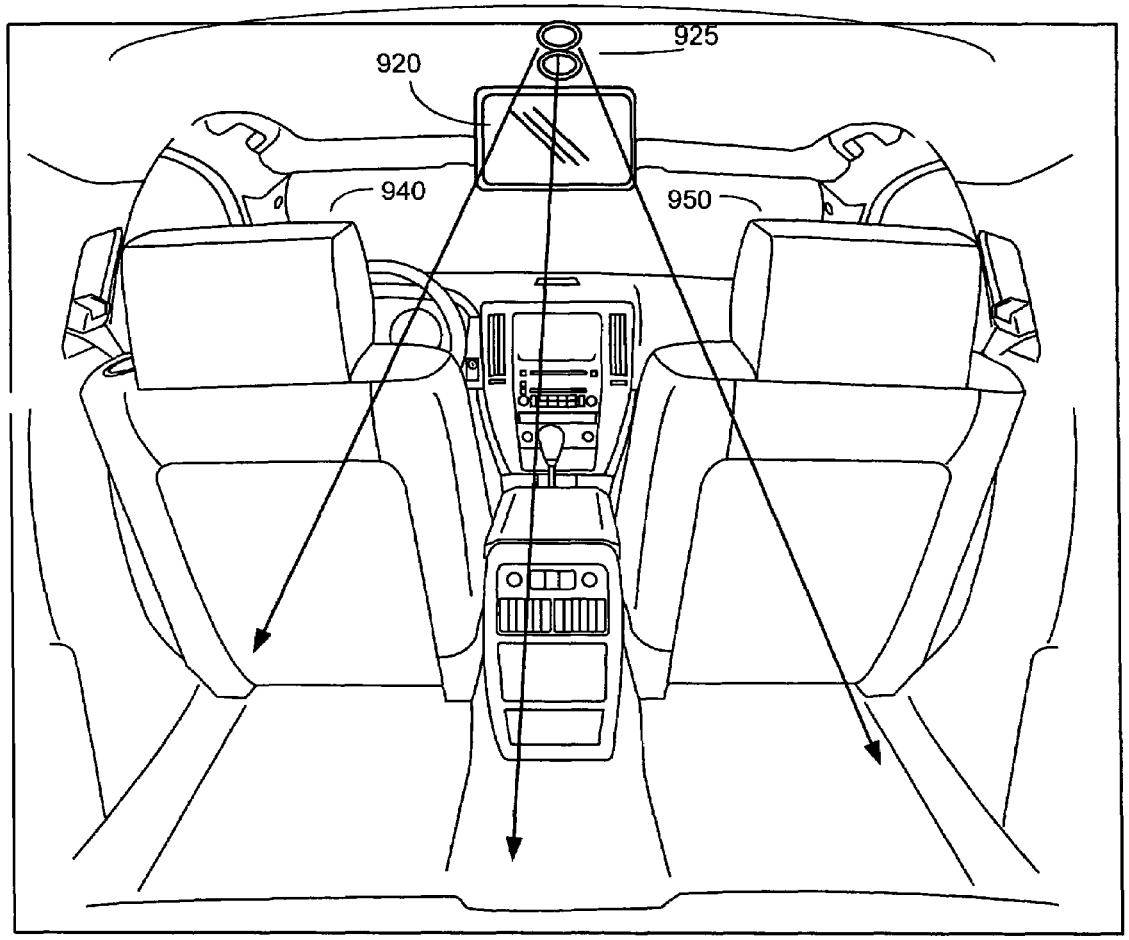
FIG. 9 is an alternative embodiment of the invention where a directional loudspeaker is mounted near a center mounted video display, orientated to radiate sound primarily towards the rear of the vehicle.

FIG. 9 depicts an alternative embodiment of the invention. In this embodiment, directional loudspeaker 925, here shown as an array of two transducers, is mounted in the ceiling of the vehicle, slightly rearward of the location of video display 920. The directivity pattern of the array is designed to radiate less energy toward occupants of front seats 940 and 950, and relatively more energy toward rear seat occupants (rear seats and other rear speakers not shown). A directivity pattern with a supercardioid, hypercardioid or similar first order gradient pattern, may be useful. Nulls in the radiation pattern are oriented to face toward the front seat occupants. Such an orientation minimizes the chances that directional speaker 925 will cause shifts in localization for the front seat occupants.

Figure 10:
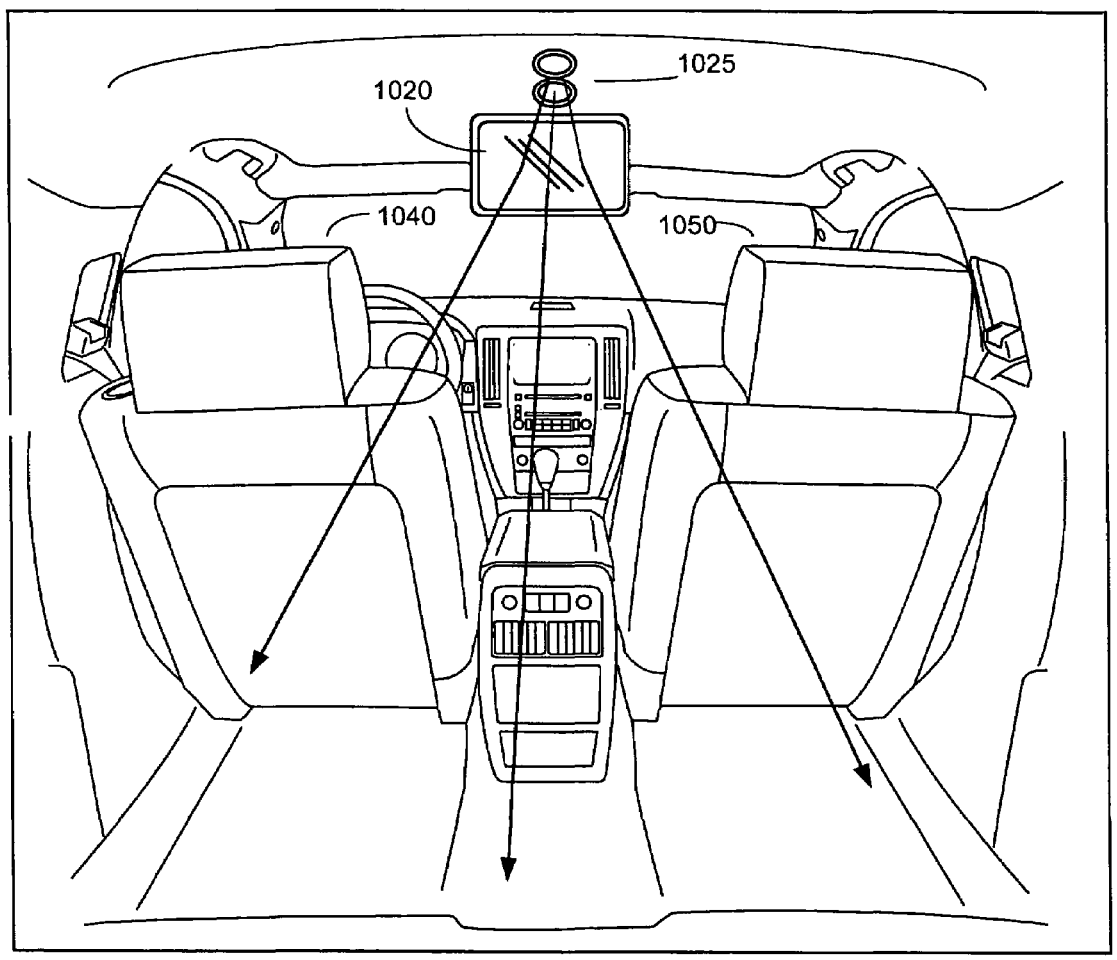
FIG. 10 is an alternative embodiment of the invention where a directional loudspeaker is mounted near a center mounted video display, orientated to radiate sound primarily towards the video display to reflect radiated sound off the display towards the rear of the vehicle.

FIG. 10 depicts another alternative embodiment of the invention, similar to that shown in FIG. 9. In FIG. 10, directional loudspeaker 1025 is oriented such that its direction of maximum radiation is pointed towards video display (rather than away as was the case in FIG. 9). Note that rear seats and rear speakers are not shown. Directional speaker 1025 projects sound energy toward video display 1020 so that it can be reflected off display 1020 back towards the rear seat passengers. It may be difficult to design a directivity pattern for this orientation that does not affect front seat passengers while still achieving proper behavior for rear seat passengers.

In this embodiment, signals applied to directional speaker 1025 may be delayed with respect to signals containing the same information applied to speakers in the front of the vehicle, to reduce the shift in perceived image location that may occur for front seat passengers. A useful radiation pattern for this embodiment would orient nulls in the radiation pattern towards the rear seat passengers. With this arrangement, little direct sound would arrive at the rear seat locations from the array. Sound from the array would instead reflect off the video display first, before arriving at the rear seat locations.

Thus, as described in detail above, embodiments of the invention provide methods and mechanisms for creating a perception of a sound image located at or near a video display in a vehicle. While the embodiments of the invention have been particularly shown and described with references to preferred embodiments thereof, it will be understood by those skilled in the art that various changes in form and details may be made therein without departing from the spirit and scope of the invention, as defined by the appended claims. For example, speakers in locations other than the exemplary speaker locations depicted above may also be configured to employ the techniques described above. Other examples include speakers mounted in doors, pillars, seats, consoles, ceilings, etc. employing the technique of creating a phantom sound image at or near a video screen or other desired location.

In addition, it should be understood that various different signals and signal types may also employ the concepts described above. For example, the embodiments thus described, focus on the placement of center channel information provided by a surround sound system. Alternatively, it may be desirable to create a phantom image containing speech near a video display by bleeding parts of a speech signal or signal having other content to one or more speakers of a monophonic or stereo system. The signal(s) added in may be, for example, a monophonic channel or center channel containing speech, etc. or other signals. These "added-in" signals may exist in their native form, or alternatively they may be obtained by decoding systems/mechanisms. For example, surround channel signals derived from a stereo channel sources, right-left sum and minus combinations, pro-logic decoding or other matrix decoding mechanisms, etc.

Various other embodiments of the invention employing the methods and techniques described above in conjunction with different configurations of speakers, etc. are also possible. The methods and techniques described may be applied in the front or rear of the vehicle, or both. In some embodiments there may be a video display (e.g. for a television, connected to a video recorder, DVD player, a navigation display) in the front of a vehicle for front seat passengers and/or in the rear of the vehicle for rear seat passengers. Video displays mounted to the ceiling may fold flat against the ceiling when not in use, and fold down when used, or may permanently be folded down. Displays in the front of the vehicle may hide when not in use or may be permanently viewable. Displays may be of any type, including but not limited to CRT, LCD, plasma, projection (front or rear), OLED, or any other possible display mechanism that may be used.

Additionally, certain techniques for rear seat systems described above can be applied to both the front seat and rear seat subsystems in order to deal with the interplay between both subsystems. For example, it is possible that depending on the location of speakers in the rear of the vehicle and how much center information is provided to them that the speakers in the rear of the vehicle could affect the perception of the originating location of the center channel image of front seat passengers. Accordingly, it is desirable to have a majority of the energy from front seat speakers (FIG. 1, see 111, 112, 113), (FIG. 2, see 211, 212, 213), (FIG. 3, see 311, 312, 313) radiating toward the rear of the vehicle and minimal amount of energy from the rear seat speakers (FIG. 1, see 102, 103, 101), (FIG. 2, see 202, 203, 201), (FIG. 3, see 302, 303, 301), (FIG. 4, see 423, 424) radiating toward the front of the vehicle so as to minimize the effect on the center image perceived by passengers in the front of the vehicle It is also possible to delay signals transmitted by rear seat speakers (FIG. 1, see 102, 103, 101), (FIG. 2, see 202, 203, 201), (FIG. 3, see 302, 303, 301), (FIG. 4, see 422, 423, 424, 425) with respect to signals in the front seats (FIG. 1, see 101), (FIG. 2, see 211, 212, 213), (FIG. 3, see 311, 312) so that signals from the front speakers will more strongly influence localization in the front seat than signals in the front seat originating from the rear of the vehicle.

Furthermore, the front of a vehicle tends to be more asymmetric with respect to the centerline of the vehicle than the rear of the vehicle. For example, in the front, the driver's area may jut out more, the front dash juts out more and the driver's area is a more cocooned than the passenger area. Techniques for affecting the directivity of signals, as described above, may be applied to the front of the vehicle in order to effect favorable changes in the sound image(s) generated.

A number of embodiments of the invention have been described. Nevertheless, it will be understood that various modifications may be made without departing from the spirit and scope of the invention. Accordingly, other embodiments are within the scope of the following claims.

What is claimed is:

1. Apparatus for transducing video signals and related audio signals in a vehicle including
   a source of said video signals and related audio signals in said vehicle,
   a first video display and a second video display mounted in said vehicle constructed and arranged to transduce said video signals and display visible images characteristic thereof, and
   first and second viewer seats in said vehicle constructed and arranged to allow first and second viewers in respective first and second viewer seats to view said images,
   the apparatus comprising:
   a first loudspeaker displaced from said first video display,
   a second loudspeaker displaced from said second video display, and
   signal processing circuitry coupling said source of audio signals to said first and second loudspeakers and constructed and arranged to process said audio signals so that said first and second viewers perceive sound radiated by said respective first and second loudspeakers as originating from said respective first and second video displays,
   wherein said signal processing circuitry is constructed and arranged to modify the spectral content of the audio signals applied to the first and second loudspeakers by applying filters having filter transfer functions $H3(i\omega)$ for each of the first and second loudspeakers representing the differences between a head related transfer function $H1(i\omega)$ between a source located at the actual first or second loudspeaker location and at least one ear of the corresponding first or second viewer when in the corresponding first or second seat and a head related transfer function $H2(i\omega)$ between a source located at the corresponding first or second video display location and the at least one ear of the corresponding first or second viewer when in the corresponding first or second seat, the third transfer functions $H3(i\omega)$ for each of the first and second loudspeakers corresponding to a filter transfer function that is $H2(i\omega)/H1(i\omega)$ for the corresponding first or second loudspeakers.

2. The apparatus of claim 1 wherein the azimuth of the first and second video displays with respect to the respective first and second viewers and the azimuth of the respective first and second loudspeakers with respect to the respective first and second viewers are substantially the same.

3. The apparatus of claim 1 wherein the elevation of the first and second video displays with respect to the respective first and second viewers and the elevation of the respective first and second loudspeakers with respect to the respective first and second viewers are different.

4. The apparatus of claim 1 wherein the first and second loudspeakers are directional loudspeakers that direct a first portion of content to areas in front of the respective first and second video displays.

5. The apparatus of claim 4 wherein the audio signal source comprises center, left and right channels each having information associated therewith,
the first portion of the content comprises center channel information, and
the first directional loudspeaker additionally radiates a left channel audio signal information and the second directional loudspeaker additionally radiates a right channel signal.

6. Apparatus in accordance with claim 1 and further comprising at least left and right loudspeakers to the left and right respectively of said viewer seats wherein said signal processing circuitry also couples said source of audio signals to said left and right loudspeakers 7. The apparatus of claim 6 wherein the left and right loudspeakers radiate respective left and right channel information from the source of audio signals and each also radiate a portion of the center channel information.

8. The apparatus of claim 7 wherein the magnitude of center channel information applied to said third and fourth loudspeakers is adjusted so that a viewer seated in either of said viewer seats perceives the center channel information as if it were radiated from the location of one of the video displays.

9. The apparatus of claim 7 further comprising signal processing circuitry constructed and arranged to adjust time delay of audio signals, wherein the signal processing circuitry adjusts the relative time delay of center channel information applied to said third and fourth loudspeakers relative to the center channel signal applied to said first and second loudspeakers, so that a viewer seated in either of said viewer seats perceives the center channel information as if it were radiated from the location of one of the video displays.

10. Apparatus in accordance with claim 1 and further comprising at least left and right loudspeakers mounted in the ceiling of said vehicle rearward of said first and second video displays and forward of the head of a viewer when in a viewer seat wherein said signal processing circuitry couples said source of audio signals to said left and right loudspeakers.

11. Apparatus in accordance with claim 1 wherein said vehicle has left and right front seats and wherein
said first loudspeaker comprises a left pair of electroacoustical transducers in the back of said left front seat,
said second loudspeaker comprises a right pair of electroacoustical transducers in the back of said right front seat, and
said signal processing circuitry couples said source of audio signals to said left pair of electroacoustical transducers and said right pair of electroacoustical transducers and is constructed and arranged to process said audio signals so that a viewer in a viewer seat behind said left front seat and a viewer in said viewer seat behind said right front seat each perceive sound radiated by said electroacoustical transducers as originating from said respective first and second video displays.

12. Apparatus in accordance with claim 1 wherein said signal processing circuitry is constructed and arranged to modify the spectral content of the signal applied to said first and second loudspeakers to change the azimuth of sound output by said first and second loudspeakers as perceived by the corresponding first and second viewers from the corresponding first and second seats.

13. Apparatus in accordance with claim 1 wherein said signal processing circuitry is constructed and arranged to modify the spectral content of the signal applied to said first and second loudspeakers to change the elevation angle of sound output by said first and second loudspeakers as perceived by the corresponding first and second viewers from the corresponding first and second seats.

14. The apparatus of claim 1 wherein said source of related audio signals comprises a center channel, the center channel further comprising speech information.

15. The apparatus of claim 1 wherein said first loudspeaker comprises first and second electroacoustical transducers, constructed and arranged to act as an array, and said second loudspeaker comprises third and fourth electroacoustical transducers also constructed and arranged to act as an array.

16. The apparatus of claim 1 wherein said first and second loudspeakers are mounted in the ceiling of said vehicle.

17. The apparatus of claim 16 wherein said first and second loudspeakers are constructed and arranged to radiate primarily a high frequency portion of said audio signals.

18. The apparatus of claim 17 further comprising a third loudspeaker mounted in the vehicle, the third loudspeaker not located proximate to the first or second display and constructed and arranged to radiate a mid frequency portion of said audio signals corresponding to said high frequency portion radiated by said first and second loudspeakers.

19. The apparatus of claim 1 further comprising a second pair of seats in said vehicle located in front of said viewer seats, wherein said first and second loudspeakers are mounted in the backs of said second pair of seats for radiating audio signals to viewers located in said viewer seats.

20. The apparatus of claim 1 wherein said signal processing circuitry further comprises crosstalk cancellation processing.

21. Apparatus for transducing audio signals in a vehicle including a source of audio signals in said vehicle, comprising left, center, and right channels having information associated therewith, and
a first pair seats spaced apart in said vehicle to the left and right, respectively, of a centerline of the vehicle, the apparatus comprising:
a first loudspeaker mounted on the left side of the vehicle,
a second loudspeaker mounted on the right side of the vehicle,
a third loudspeaker mounted to the left of the centerline of the vehicle and to the right of the first transducer,
a fourth loudspeaker mounted to the right side of the centerline of the vehicle and to the left of the second transducer, and
signal processing circuitry couolina said source of audio signals to said first through fourth loudspeakers, wherein the first loudspeaker radiates left channel information, the second loudspeaker radiates right channel information, and the third and fourth loudspeakers radiate center channel information, and said signal processing circuitry is constructed and arranged to process said audio signals so that first and second listeners seated in the respective first and second seats each perceive sound radiated by said first through fourth transducers and corresponding to said center channel as if it were radiated from a location substantially in front of the listener, said signal processing circuitry constructed and arranged to so process said audio signals by modifying the spectral content of the audio signals applied to the third and fourth loudspeakers by applying filters having filter transfer functions $H3(iw)$ for each of the third and fourth loudspeakers representing the differences between a head related transfer function $H1(i\omega)$ between a source located at the actual third or fourth loudspeaker location and at least one ear of the corresponding first or second listener when in the corresponding first or second seat and a head related transfer function $H2(i\omega)$ between a source located substantially in front of the respective first or second seat and the at least one ear of the corresponding first or second listener when in the corresponding first or second seat, the third transfer functions $H3(i\omega)$ for each of the third and fourth loudspeakers corresponding to a filter transfer function that is $H2(i\omega)/H1(i\omega)$ for the corresponding third or fourth loudspeakers.

22. The apparatus of claim 21 wherein the first pair of seats are front seats in the vehicle, and first, second, third, and fourth loudspeakers are mounted behind said front seats.

23. The apparatus of claim 22 wherein at least the third loudspeaker is mounted in the back of one the front seats, and the fourth loudspeaker is mounted in the back of the other of the front seats.

24. The apparatus of claim 21 wherein the first and second loudspeakers also radiate center channel information.

25. The apparatus of claim 24 wherein the signal processing circuitry is further constructed and arranged to adjust the magnitude of center channel information applied to said first and second loudspeakers in cooperation with the filters applied to the signals for the third and fourth loudspeakers so that a listener seated in either of said seats perceives the center channel information as if it were radiated from the location substantially in front of the listener.

26. The apparatus of claim 24 wherein the signal processing circuitry is further constructed and arranged to adjust time delay of audio signals, wherein the signal processing circuitry adjusts the relative time delay of center channel information applied to said third and fourth loudspeakers relative to the center channel information applied to said first and second loudspeakers, so that a listener seated in either of said first and second seats perceives the center channel information as if it were radiated from the location substantially in front of the listener.

* * * * *